L. C. ARNAUD.
FRAME FOR FRICTIONAL CHANGE OF SPEED GEARING.
APPLICATION FILED APR. 28, 1910.

1,012,792.

Patented Dec. 26, 1911.
2 SHEETS—SHEET 1.

WITNESSES:

INVENTOR,
LOUIS CAMILLE ARNAUD,
Attorney.

L. C. ARNAUD.
FRAME FOR FRICTIONAL CHANGE OF SPEED GEARING.
APPLICATION FILED APR. 28, 1910.
1,012,792.
Patented Dec. 26, 1911.
2 SHEETS—SHEET 2.
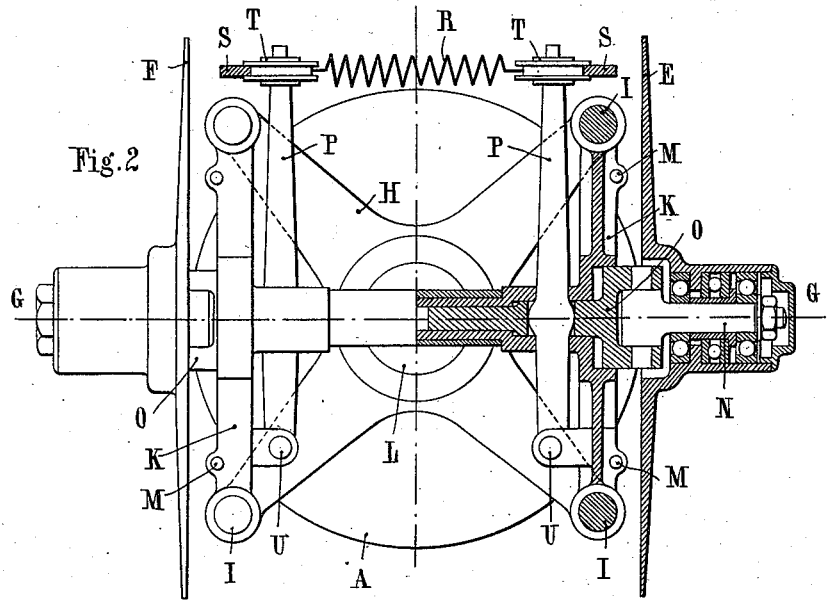
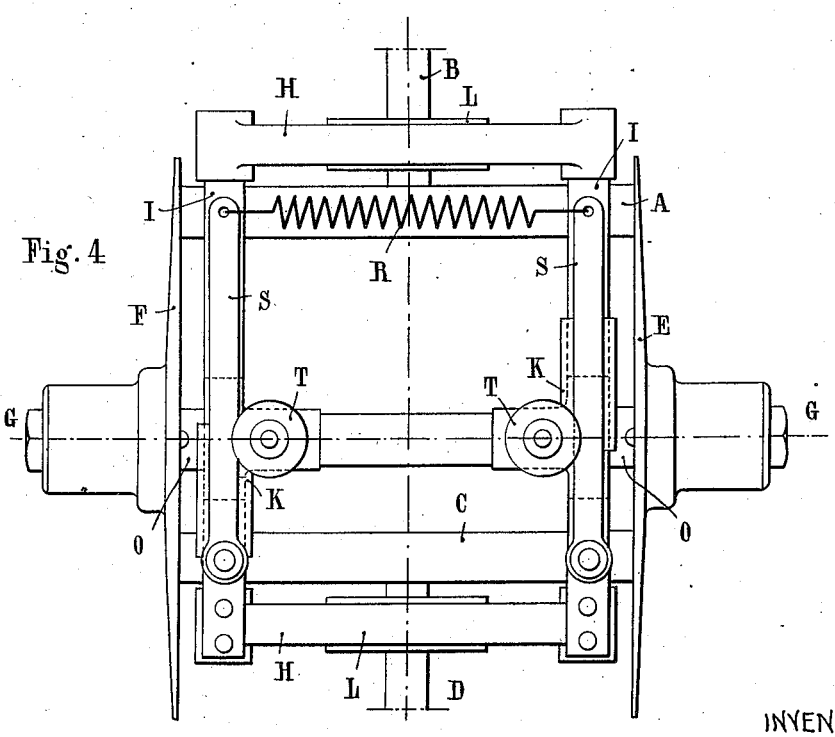
WITNESSES:
INVENTOR,
LOUIS CAMILLE ARNAUD,
by
Attorney.

UNITED STATES PATENT OFFICE.

LOUIS CAMILLE ARNAUD, OF FORCALQUIER, FRANCE.

FRAME FOR FRICTIONAL CHANGE-OF-SPEED GEARING.

1,012,792. Specification of Letters Patent. Patented Dec. 26, 1911.

Application filed April 28, 1910. Serial No. 558,221.

*To all whom it may concern:*

Be it known that I, LOUIS CAMILLE ARNAUD, citizen of the Republic of France, and residing at Forcalquier, Basses-Alpes, France, have invented a Frame for Frictional Change-of-Speed Gearing.

This invention relates to gearing and more particularly to gearing such as is described in my co-pending applications No. 558220 and No. 558222.

My invention relates to a frame for frictional change-of-speed gearing.

It relates particularly to a frame for a change of speed gearing which is composed of two friction wheels and two friction disks, and which is variable gradually and continuously.

Figure 1:
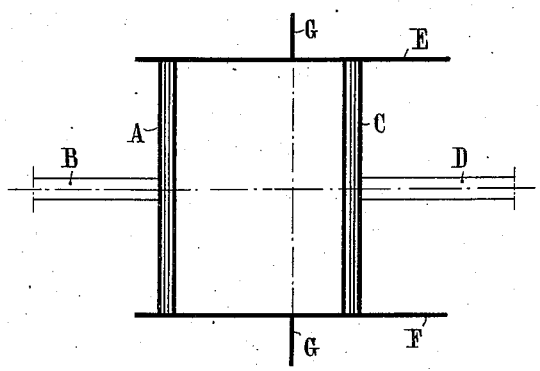
Figure 3:
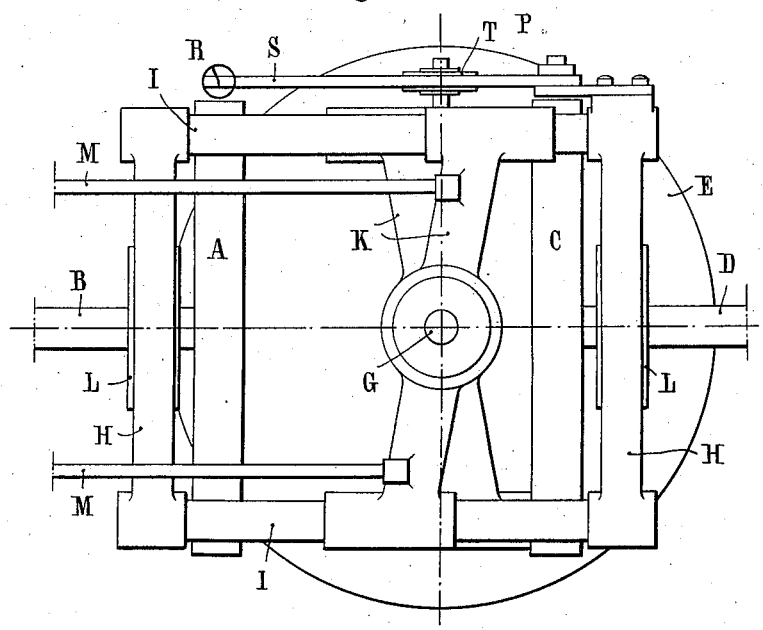

In the drawings attached to and forming part of the present application: Figure 1 shows diagrammatically the system of variable speed-gearing to which the present device relates; Fig. 2 shows the device in front view on the left side, and in a vertical section through the axis of one disk on the right side; Fig. 3 is a side elevation in which the front disk is removed, and Fig. 4 is a plan view.

Referring to the drawings:—A is a friction wheel mounted on the driving shaft B; C is a friction wheel parallel to and equal in diameter to A and mounted on the driven shaft D; E and F, friction disks mounted loose on the shaft G G: H H are two cross pieces; I, four steel rods; K, the oblique parts; L are the bearings, and M the rods actuating the parts K; N the axle journal; O the axle-bearing cap; P, S, levers; R, a spring, T rollers and U, the fulcrum for the levers P.

It will be seen that when the disks are brought in contact with the friction wheels the driven friction wheel revolves in the inverse direction to that of the driving wheel A.

Changes from one speed to another are effected by displacing the disks E F relatively to the friction wheels A and C, and in order to assure the efficient working of the mechanism, it is indispensable that the axes of the disks and those of the wheels should remain exactly perpendicular and in the same plane.

The frame described assures, in consequence of its great rigidity, the axes of the disks and those of the wheels remaining exactly perpendicular; at the same time, this frame is very compact and occupies little space. It is comprised essentially of two cross-pieces connected together rigidly by four parallel rods of any preferred shape in cross section (these four rods are shown as cylindrical in the annexed drawings).

H H represent two cross-pieces which are stayed by four steel rods or tubes. The ensemble thus made up forms an indeformable parallelepiped inside which are arranged the friction wheels A and C. The disks E and F, on the contrary, are arranged outside the parallelepiped, and are carried by oblique pieces K which can slide on the rods I connecting the cross-pieces H.

The oblique arrangement of parts K with respect to the slide-rods I has for object the prevention of any wedging together of these parts. Finally, the center of the cross-pieces serves as a seat for the bearings L, in which the shafts bearing the rollers revolve.

Changes in speed are effected by causing the oblique parts K to slide, by actuating rods M.

Claims:

1. A frame comprising two cross-pieces H, four tubes I secured to said cross-pieces at their extremities so as to constitute a rigid whole forming an indeformable parallelepipedon, bearings L carried by said cross-piece, shafts B and D passed into said bearings, wheels A and C fixed on said shafts B and D respectively, oblique members K slidable on said tubes I, a hollow shaft in the oblique members and fastening the same together, shafts engaging in the hollow shaft, plates E and F rotatable on the ends of the last named shafts and arranged exterior to the frame, said wheels A and C being adapted to come into contact with said plate.

2. In combination, a frame composed of two cross-shaped pieces having alined bearings at the intersections of their arms, and four tubes fastened at the ends of the arms respectively so as to constitute a rigid whole forming an indeformable parallelepipedon, shafts carried in said bearings, wheels on said shafts, oblique members slidable on said tubes, a hollow shaft in the oblique members and fastening the same together, shafts engaging in the hollow shaft, and rotatable plates on said last named shafts, exterior to the frame and adapted to be moved into or out of contact with said wheels.

In testimony whereof I affix my signature in presence of two witnesses.

LOUIS CAMILLE ARNAUD.

Witnesses:
PAUL H. CRAM,
ALLAN MACFARLANE.

Copies of this patent may be obtained for five cents each, by addressing the "Commissioner of Patents, Washington, D. C."